US007139340B2

(12) United States Patent
Scarpa

(10) Patent No.: US 7,139,340 B2
(45) Date of Patent: Nov. 21, 2006

(54) ROBUST OFDM CARRIER RECOVERY METHODS AND APPARATUS

(75) Inventor: Carl G. Scarpa, Plainsboro, NJ (US)

(73) Assignee: Hitachi, Ltd., Tokyo (JP)

( * ) Notice: Subject to any disclaimer, the term of this patent is extended or adjusted under 35 U.S.C. 154(b) by 936 days.

(21) Appl. No.: 10/185,971

(22) Filed: Jun. 28, 2002

(65) Prior Publication Data

US 2004/0001563 A1 Jan. 1, 2004

(51) Int. Cl.
*H04L 27/06* (2006.01)

(52) U.S. Cl. ....................................... 375/344; 375/326

(58) Field of Classification Search ................ 375/326, 375/316, 340, 344, 224, 285, 342, 346; 370/206; 455/192.2, 192.3

See application file for complete search history.

(56) References Cited

U.S. PATENT DOCUMENTS

| | | | | |
|---|---|---|---|---|
| 4,829,543 A * | 5/1989 | Borth et al. | ................ | 375/329 |
| 4,847,869 A * | 7/1989 | Labedz et al. | .............. | 375/331 |
| 5,131,006 A | 7/1992 | Kamerman et al. | | |
| 5,170,415 A | 12/1992 | Yoshida et al. | | |
| 5,206,886 A | 4/1993 | Bingham | | |
| 5,245,611 A * | 9/1993 | Ling et al. | .................. | 370/347 |
| 5,272,446 A | 12/1993 | Chalmers et al. | | |
| 5,406,551 A | 4/1995 | Saito et al. | | |
| 5,448,601 A | 9/1995 | Choi | | |
| 5,483,529 A | 1/1996 | Baggen et al. | | |
| 5,502,506 A | 3/1996 | Choi | | |
| 5,732,113 A | 3/1998 | Schmidl et al. | | |
| 5,835,731 A | 11/1998 | Werner et al. | | |
| 5,848,105 A | 12/1998 | Gardner et al. | | |
| 5,912,876 A | 6/1999 | H'mimy | | |
| 6,035,003 A | 3/2000 | Park et al. | | |
| 6,097,770 A * | 8/2000 | Bahai et al. | ................ | 375/343 |
| 6,128,276 A | 10/2000 | Agee | | |
| 6,134,286 A | 10/2000 | Chennakeshu et al. | | |
| 6,181,714 B1 | 1/2001 | Isaksson et al. | | |

(Continued)

FOREIGN PATENT DOCUMENTS

EP 0844765 A2 5/1998

(Continued)

OTHER PUBLICATIONS

Y. Zhao and A. Huang, "A Novel Channel Estimation Method for OFDM Mobile Communication Systems Based on Pilot Signals and Transform-Domain Processing", Helsinki University of Technology, 1997, pp. 2089-2093.

(Continued)

*Primary Examiner*—Jean B. Corrielus
(74) *Attorney, Agent, or Firm*—Michael P. Straub; Straub & Pokotylo

(57) ABSTRACT

Methods and apparatus for estimating and correcting carrier frequency offsets in a bust multi-tone receiver are described. Course and fine carrier frequency estimates are generated from the signal's preamble. Decision directed carrier frequency offset estimates are then generated from the signal field and data fields of the multi-tone signal. Frequency error estimates are generated for each tone of the signal and combined using a weighted average to generate the frequency error estimate used to perform the correction operation. Error estimates corresponding to noisy data tones are weighted less then estimates corresponding to less noisy data tones. In cases of low SNR frequency error estimates corresponding to pilots are weighted by an extra amount as compared to error estimates corresponding to tones used to transmit data symbols. During times of high SNR error estimates corresponding to pilot tones are weighted in the same manner as error estimates corresponding to data tones.

33 Claims, 11 Drawing Sheets

U.S. PATENT DOCUMENTS

| | | | | |
|---|---|---|---|---|
| 6,198,782 | B1 | 3/2001 | DeCourville et al. | |
| 6,219,334 | B1 | 4/2001 | Sato et al. | |
| 6,275,543 | B1 * | 8/2001 | Petrus et al. | 375/324 |
| 6,292,135 | B1 | 9/2001 | Takatori et al. | |
| 6,295,326 | B1 | 9/2001 | Tonissen et al. | |
| 6,317,470 | B1 | 11/2001 | Kroeger et al. | |
| 6,646,980 | B1 * | 11/2003 | Yamamoto et al. | 370/208 |
| 6,678,317 | B1 * | 1/2004 | Murakami et al. | 375/232 |
| 6,680,901 | B1 * | 1/2004 | Yamamoto et al. | 370/208 |
| 6,690,747 | B1 * | 2/2004 | Petrus et al. | 375/324 |
| 6,735,262 | B1 * | 5/2004 | Kim et al. | 375/326 |
| 6,845,133 | B1 * | 1/2005 | Heinrich et al. | 375/346 |
| 6,882,691 | B1 * | 4/2005 | Chiodini | 375/326 |
| 6,925,136 | B1 * | 8/2005 | Pettit | 375/362 |
| 6,950,483 | B1 * | 9/2005 | Chiodini | 375/354 |
| 6,983,028 | B1 * | 1/2006 | Ahn | 375/326 |
| 7,039,140 | B1 * | 5/2006 | Reagan et al. | 375/355 |
| 2001/0021182 | A1 | 9/2001 | Wakutsu | |
| 2001/0031022 | A1 * | 10/2001 | Petrus et al. | 375/324 |
| 2002/0001352 | A1 | 1/2002 | Stirling-Gallacher et al. | |
| 2002/0034213 | A1 | 3/2002 | Wang et al. | |
| 2002/0037057 | A1 | 3/2002 | Kroeger et al. | |

FOREIGN PATENT DOCUMENTS

| | | | |
|---|---|---|---|
| EP | 1 178 630 | A1 | 2/2002 |
| EP | 1 178 640 | A1 | 2/2002 |
| EP | 1 178 642 | A2 | 2/2002 |
| JP | 10303852 | A | 11/1998 |
| JP | 2001-136149 | | 5/2001 |
| WO | WO 02/23781 | A1 | 3/2002 |

OTHER PUBLICATIONS

P. H. Moose, "A Technique for Orthogonal Frequency Division Multiplexing Frequency Offset Correction", IEEE Transactions of Communications, vol. 42, No. 10, Oct. 1994, pp. 2908-2914.

J. Heiskala and J. Terry Ph.D., "OFDM Wireless LANs: A Theoretical and Practical Guide", Sams Publishing, pp. 1-315, (2002).

H. Ochiai, "Performance Analysis of Deliberately Clipped OFDM Signals", IEEE Transactions on Communications, vol. 50, No. 1, Jan. 2002, pp. 89-101.

C. W. Wong, C. L. Law, Y. L. Guan, "Channel Estimator for OFDM Systems with 2-Dimensional Filtering in the Transform Domain", Nanyang Technological University, 2001, pp. 717-721.

J. K. Moon and S. I. Choi, "Performance of Channel Estimation Methods for OFDM Systems in a Multipath Fading Channels", IEEE, 2000, pp. 161-170.

T. Onizawa, M. Mizoguchi, T. Sakata and M. Morikura, "A Simple Adaptive Channel Estimation Scheme for OFDM Systems", NTT Access Network Service Systems Laboratories, 1999, pp. 279-283.

G. Cariolara and F. C. Vagliani, "An OFDM Scheme with a Half Complexity", IEEE Journal of Selected Areas in Communications, vol. 13, No. 9, Dec. 1995, pp. 1586-1599.

* cited by examiner

570

| MODULATION TYPE (902) | MEASURED NOISE POWER THRESHOLD (904) | PILOT BOOST FACTOR (906) |
|---|---|---|
| BPSK | N/A | 1 |
| QPSK | 12 | 8 |
| 16 QAM | 2.5 | 8 |
| 64 QAM | 0.5 | 8 |

ROBUST OFDM CARRIER RECOVERY METHODS AND APPARATUS

FIELD OF THE INVENTION

The present invention relates to communication systems and, more particularly, to methods and apparatus for adjusting a receiver to the carrier frequency of a signal, e.g., a burst OFDM signal.

BACKGROUND

Many modern high speed Local Area networks (LAN) systems have adopted burst Orthogonal Frequency Division Multiplexing (OFDM) as their physical layer. Examples of communications standards based on burst OFDM include 802.11a and hyperLan II standards. It is well know in the art that while OFDM is excellent for handling severe multipath, its performance is extremely sensitive to frequency offsets. Any mismatch in the receiver local oscillator and the transmitted signal can cause a loss of orthogonality between the carriers, this can lead to severe Inter-Channel Interference (ICI). Such mismatch is sometimes called a carrier frequency error since the oscillator is not synchronized with the carrier frequency of the transmitted signal.

Because of the potential loss of orthogonality between the carriers, carrier recovery is one of the most critical functions to perform when processing OFDM signals correctly.

FIG. 1 illustrates an exemplary signal structure 100 for the 802.11a wireless standard. FIG. 1 outlines the various OFDM symbols that make up a typical 802.11a signal. The signal structure 100 is separated into three fields, a preamble 134, a signal field 136 and a data field 138. The preamble field 134 comprises the first 16 μs 102 of the 802.11a signal structure 100. Burst OFDM signals use a preamble field 134 of the illustrated type because the signals are bursty in nature. The preamble facilitates channel estimation. In contrast, continuous OFDM signals need not use preambles since their relatively long durations provide time for channel estimation to be performed without the aid of a preamble. The preamble field 134 has two sections, the first section 114 is 8 μs 104 in duration and includes 10 short, repeating units of data ($t_1$ through $t_{10}$ each 16 samples long at 20 Mhz sampling rate, and all being identical in value). The second section 116 is also 8 μs 106 in duration and includes two OFDM symbols, $T_1$ and $T_2$, packed together with a guard interval, GI2, twice the normal length. The guard interval GI2 protects the payload information from distortions due to multipath, ICI, etc.

The data from the time interval 124, which includes the first half of the first section 114 of the preamble 134, gives a receiver time to recognize that a valid burst OFDM signal is being received. The data from the time interval 126, which includes the second half of the first section 114 of the preamble 134 is normally used for coarse frequency offset estimation and timing synchronization. The data included in the second section 116 of the preamble, corresponding to time interval 106, is used for channel estimation.

The preamble 134 is followed by a signal field 136, which is an OFDM symbol that is always binary phase shift key (BPSK) modulated. The signal field 136 is 8 μs 108 long. The data in the signal time interval 108 is used for determining the rate length.

Finally, the signal field 136 is followed by a data field 138 which includes a collection of OFDM symbols 120, 122 (maximum 1365) that can be modulated using a plurality of different modulation scheme, e.g., BPSK, QPSK, 16QAM or 64QAM. These OFDM symbols 120, 122 are each 8 μs 110, 112 in length. They include a first field, GI, which is a guard interval and a second field, Data 1, Data 2, which includes data. The duration of the first field, GI, is 0.8 μs, and the duration of the second field, Data 1, Data 2, is 3.2 μs each. The data received in the time interval 132, corresponding to data field 138, is used to determine the service being used and includes the data that is trying to be sent. At the beginning of each signal field 136, system parameters, e.g., carrier offset, FFT frame time, sampling rate offset, gain control, etc., are known for proper processing of the 802.11a signal. In other words these system parameters are derived from the information sent in the preamble 134 and therefore available for use in processing signal field 136.

Burst and continuous OFDM signals need excellent carrier recovery systems to be implemented in their respective receivers because of their short signal duration and for other reasons mentioned earlier. In the art, most OFDM carrier recovery systems use what is known as the cyclic prefix correlation approach.

In burst OFDM, the OFDM symbols that carry data are processed immediately after the preamble. Given this fact and the bursty nature of burst OFDM signals, a distributed, time-averaged approach over the entire received signal to determine the true carrier offset is usually not an option. This problem is particularly troublesome under low SNR conditions. It would be desirable if a method were available where carrier frequency correction could be based, at least in part, on the data transmitted immediately following a preamble.

Therefore there is a need for a robust carrier recovery system, e.g., that intelligently processes more sections of the signal to achieve more accurate carrier offset determinations in the relatively short amount of time available.

SUMMARY OF THE INVENTION

The present invention is directed to methods and apparatus for recovering a carrier frequency in, e.g., OFDM signals and burst OFDM signals in particular.

Low SNR (Signal to Noise Ratio) reception of burst OFDM signals can be complicated by carrier recovery problems. Low SNR may be due to severe multipath or additive noise on the OFDM signal. Poor estimates of the center frequency can result in loss of signal reception or unreliable tracking performance. The present invention avoids or reduces such problems by using digital signal processing techniques that take advantage of pilot signals, channel state information and noise measurements to dynamically change carrier recovery parameters.

A burst preamble is used in accordance with 802.11a spec to get a coarse estimate of carrier offset. However, rather than using one coarse measurement, a collection of data points are taken based on a running correlator. A second fine estimate of the residual error is then taken on the second half of the preamble to improve the total carrier frequency error, e.g., frequency offset, estimation.

This second estimate is derived by averaging a collection of measurements based on a second correlator of a different length than the one used to generate the coarse frequency error estimate.

In accordance with the present invention, to further improve the offset estimate, the signal field following the preamble of a burst OFDM signal is used, after channel compensation, to provide the first reliable update to the carrier offset estimation via decision directed carrier frequency error estimate. This estimate is generated, in various embodiments, using a digital PLL.

To improve tracking performance, signal-to-noise ratio information is considered and used to weight error information, e.g., frequency error indicator values, corresponding to different pilot symbols. As part of this process, in at least one exemplary embodiment, a decision directed updating of the carrier recovery system is performed, e.g., based on information in the signal field and subsequent data fields, with error signals from the imbedded pilots signals boosted under low SNR conditions.

In one particular embodiment, the SNR is roughly estimated by the noise power in the 802.11a signal field. To avoid poor decision directed updates of the carrier recovery system, selective weighting to each FFT bin, e.g., set of data corresponding to an OFDM tone, is performed. This feature avoids or reduces the effect of FFT bins with a poor SNR to corrupt the carrier recovery tracking process.

In accordance with the techniques of the present invention, carrier frequency error estimates used to correct for frequency offset errors in receiver are first based on a coarse frequency error estimate generated from a first portion the an OFDM preamble, then on a fine frequency error estimate generated from a second portion of the preamble followed by carrier frequency error estimates based on pilot tones and data symbols included in the subsequent signal fields, e.g., signal field following the preamble and data fields following the signal field.

Frequency error estimates corresponding to individual tones generated during each symbol time corresponding to the signal field and data fields are weighed, e.g., as a function of SNR information and/or channel estimate information before being combined to generate a carrier frequency error estimate for the particular symbol time period. Thanks to the use of weighting, decision directed error estimates based on data symbols can be used immediately following the signal field and weighed in combination with error estimates generated from pilot tones to produce a more useful carrier frequency error estimate than can be generated from the limited number of pilot tones included in each symbol time period following the preamble. Furthermore, the data symbol based frequency error estimates can be used without first having to wait for the error estimates generated for a particular tone to be averaged over multiple symbol time periods.

In accordance with one feature of the invention, the generated carrier frequency error estimate is used to correct for receiver frequency offsets by simply multiplying the received signal by the error estimate prior to performing an FFT operation. In this manner, the tones of the OFDM signal can be shifted to compensate for the estimated receiver frequency offset in a relatively easy and inexpensive manner.

Additional features, embodiments and benefits of the methods and apparatus of the present will be discussed below in the detailed description that follows.

BRIEF DESCRIPTION OF THE DRAWINGS

FIG. 12 illustrates a table indicating the measured noise power threshold and pilot boost factor for several different modulation schemes implemented in accordance with the present invention.

DETAILED DESCRIPTION

Figure 1:
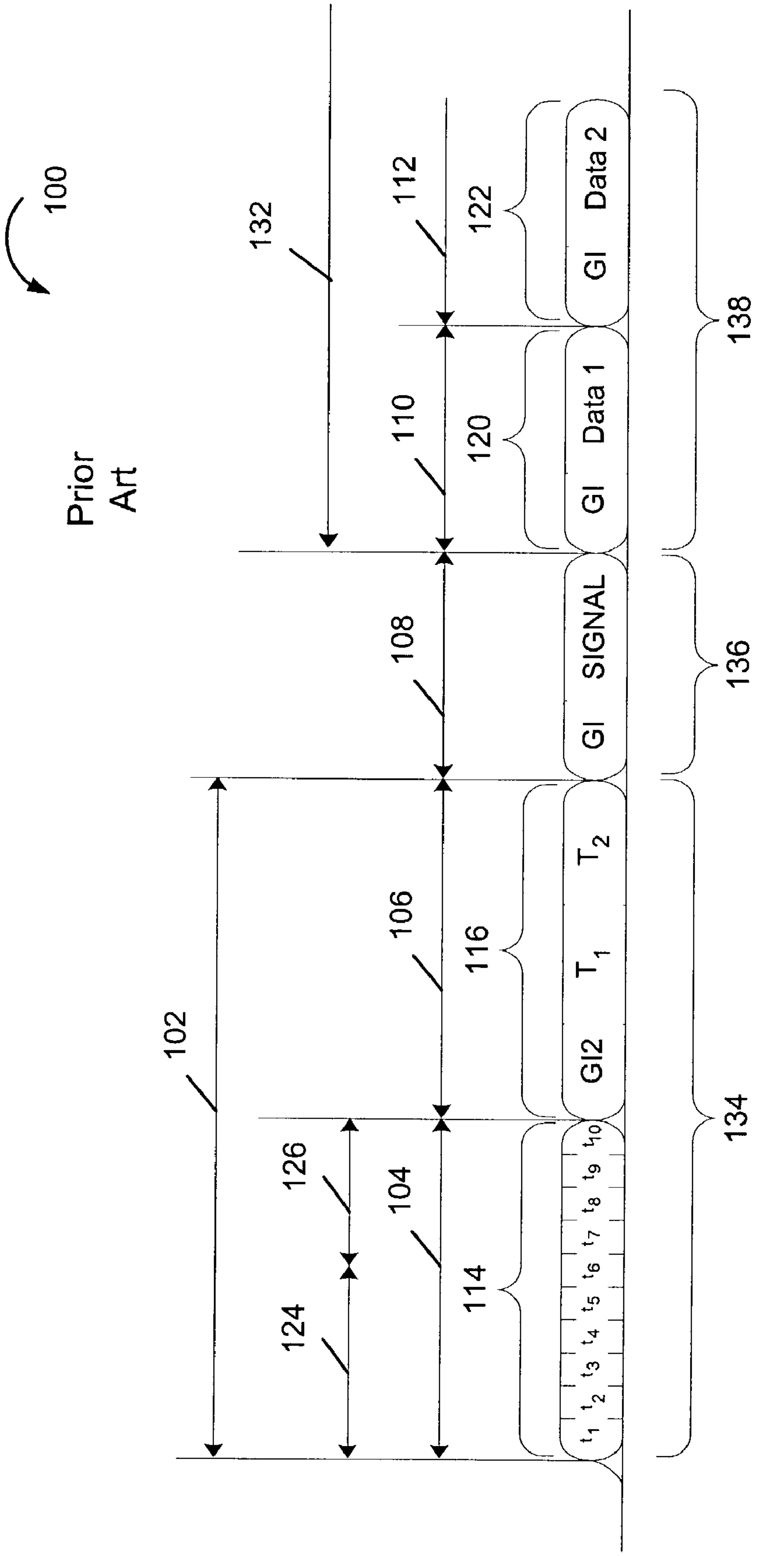
FIG. 1 illustrates the structure of an 802.11a wireless signal.
Figure 2:
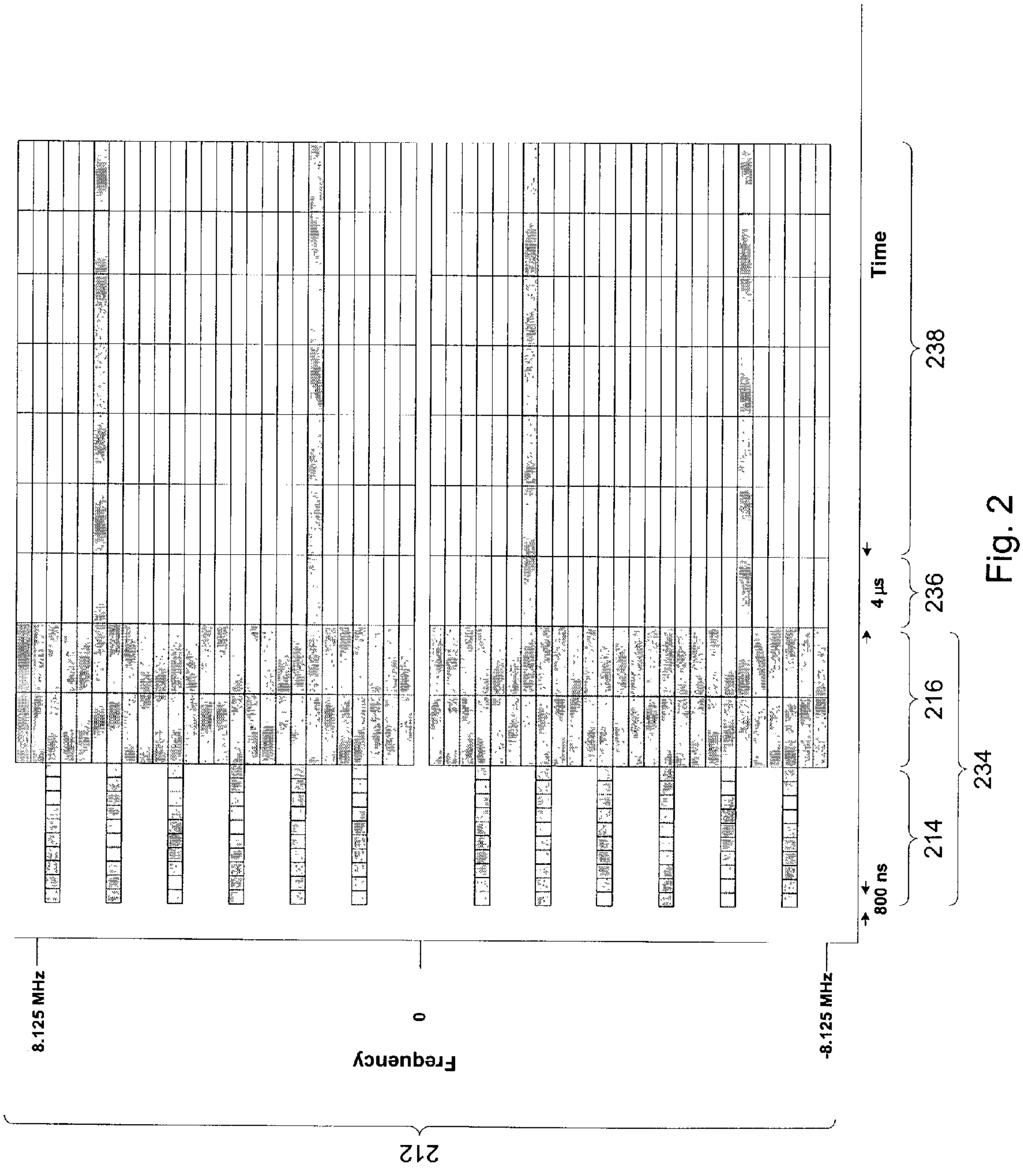
FIG. 2 illustrates a frequency versus time graph of an 802.11a wireless signal that is implemented for use with the present invention.

FIG. 2 illustrates a two dimensional plot of the frequency/time format of an 802.11a signal. The 802.11a signal is based on a 64-point FFT. This corresponds to the use of 64 tones, e.g., frequencies, in parallel. In general, other embodiments of the invention can be based on an N-point FFT, where N is any number. The vertical axis in FIG. 2 corresponds to frequency with 52 of the 64 different frequency bins being shown. Each bin represents a set of data corresponding to one of 64 tones included in the OFDM signal. Twelve carriers out of the sixty-four total carriers are used as null bins and are therefore omitted from FIG. 2. Thus, FIG. 2 illustrates the 52 bins 212 which are used to transmit information. The use of less than all 64 tones is done to ease filtering requirements when the signal is converted into the time domain via a digital to analog converter.

Moving along the horizontal time axis, the illustrated burst OFDM signal includes a preamble 234 that includes two sections 214, 216. The first section 214 is 8 μs long and includes a series of 10 short pilot symbols, e.g., the same value repeated multiple times. The second section 216 is also 8 μs long but includes two long pilot symbols instead of several short pilot symbols. As will be discussed below, since the first and second fields of the preamble are each twice the duration of a normal data symbol period, they are each counted as two symbols despite the fact that the first of the preamble actually includes 10 small symbols. The second preamble section 216 is followed by the signal filed which is 4 μs long. Which in turn is followed by the data portion of the signal which allots 4 μs to each symbol.

At the beginning of an OFDM signal burst illustrated in FIG. 2, i.e., the first 8 μs of the preamble 214, 1 out of every 4 carriers are each used to convey 10 short symbols. The other tones are not used during this portion of the burst signal. At transmission, the one out of every four utilized FFT bins are loaded with known pilots. The known pilots are used by a receiver of the present invention for gain correction, signal detection and coarse frequency estimation.

When correlation based techniques are used, loading every $4^{th}$ bin extends the carrier recovery capture range of an OFDM receiver by 4.

The second half 216 of the preamble 234, i.e., 9 µs to 16 µs, has the 52 non-null bins loaded with known pilot sequences, once again illustrated through the use of shading. The pilots in these bins are used for channel estimation. Channel State Information (CSI) for various bins, which represents the sum of squared I-phase and Q-phase channel gain estimates for the corresponding bins may be generated as will be discussed below from the channel estimates made from the symbols received during signal portion 216. Pilots in the second half 216 of the preamble are used for fine frequency estimation, in accordance with the present invention as will described further below.

The preamble is followed by the BPSK signal field 236 which is 4 µs in duration. This field is followed by the data field, section 238 which includes one symbol every 4 µs. Sections 236 and 238 include pilot data in 4 bins (shown using shading), data in 48 bins and 12 null carrier bins (not shown), totaling 64 bins per signal bandwidth. The signal field 236 is normally BPSK while the data field 238 may use a plurality of different modulation techniques, e.g., BPSK, QPSK, 16QAM, 64 QAM, etc. Since the modulation technique of the signal field 236 is BPSK and is known to be such, the symbol decisions made in signal field 236 can be used to make reasonably reliable signal error estimates including a frequency error estimate.

As will become clear from the following discussion, the frequency correction methods of the present invention use different frequency error estimation methods depending on which portion of a burst signal is being processed. In addition, it uses weighting techniques which take into consideration factors such as signal noise when weighting decision directed and/or pilot based frequency error estimates, e.g., error indicator values, corresponding to individual tones. This is done before combining the frequency error estimates, e.g., in the form of error indicator values, corresponding to individual tones to generate a carrier frequency error estimate used to perform a frequency correction operation on a received signal, e.g., prior to performing an FFT on the signal portion being subject to the frequency correction operation.

Figure 3:
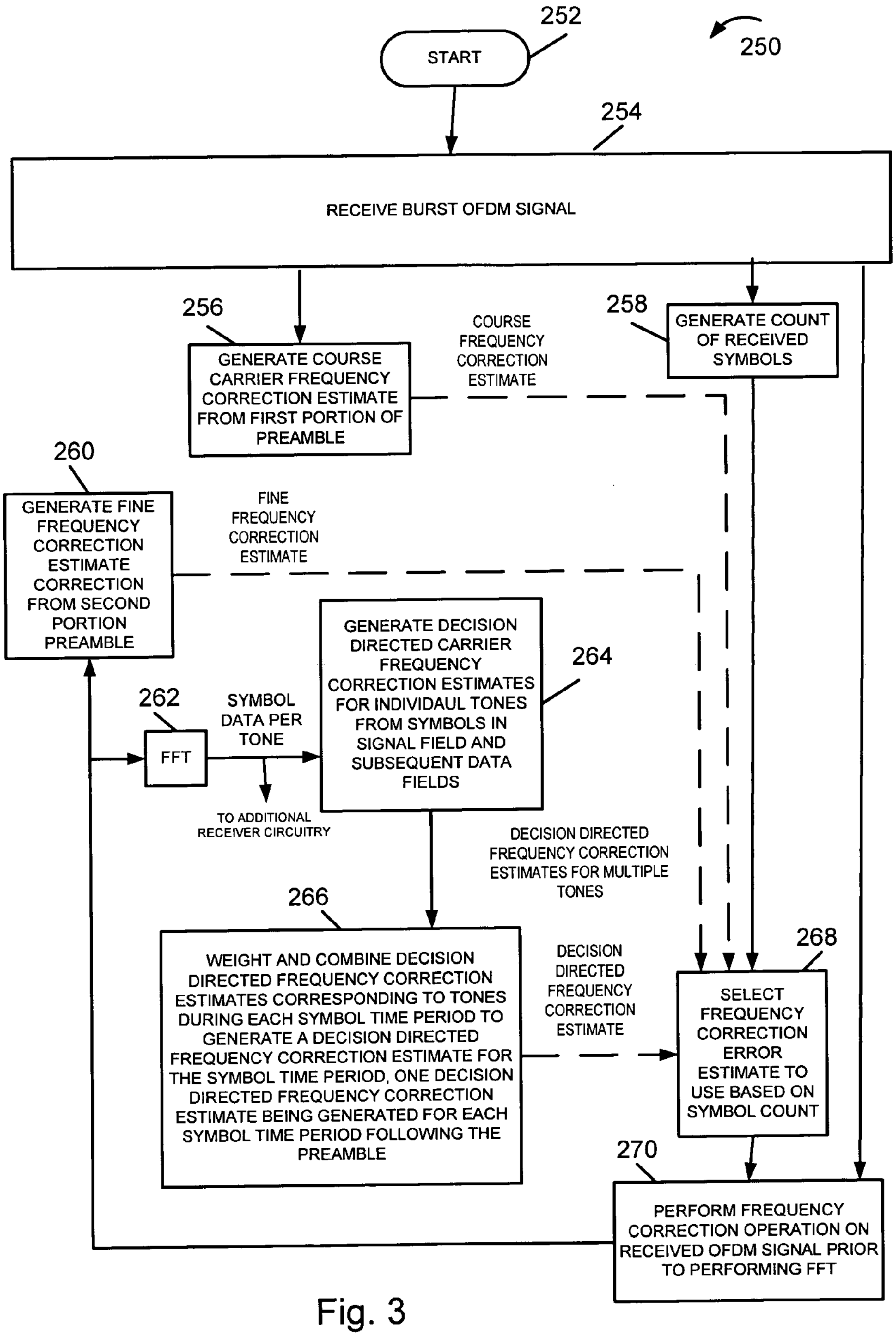
FIG. 3 illustrates steps of an exemplary burst OFDM frequency correction method of the present invention.

FIG. 3 is a flow chart 250 illustrating the steps involved in performing carrier frequency error estimation and correction operations in accordance with the present invention. The method starts in step 252 wherein a system implementing the method awaits receipt of a bust OFDM signal. Operation proceeds from step 252 to step 254 wherein a burst OFDM signal is received. Operation proceeds from step 254 to steps 256 and 258 as the burst OFDM signal continues to be received. For example, steps 256 and 258 may be performed while additional symbols are still being received. In step 256 a coarse carrier frequency correction estimate is generated from at least some of the short symbols in the first section 214 of a burst OFDM signal's preamble. The generated coarse frequency correction estimate, which is a non-decision directed carrier frequency offset error estimate, is supplied to selection step 268 which will be discussed in detail below.

Count step 258 generates a count of the 4 us symbol time periods that have passed since receipt of the signal was detected, e.g., began and signal processing has been performed. Accordingly, it represents a count of the number of symbols that have been processed, where for counting purposes symbols are treated as being 4 us long. The generated count is used to indicate the current burst signal processing point. This count in used in selection step 268 to determine which of a plurality of carrier frequency correction estimates should be used, at the particular point in time, to perform frequency correction on the received signal in step 270.

In selection step 268, a selection is made between the coarse frequency correction estimate generated in step 256, a fine frequency correction estimate generated in step 260 and a decision directed carrier frequency correction estimate generated in step 266. The selection is made based on the received symbol count generated in step 258. When the count reaches two symbols it indicates that the coarse frequency estimate will be available for use, and should be used, during the next frequency error update. When the symbol count reaches 4, it indicates that sufficient signal information e.g., the two long symbols in the preamble, has been received to generate a fine carrier frequency estimate. During the next carrier frequency error update, the selection step 268 will select the fine carrier frequency correction estimate generated in step 260 to be used in the frequency correction operation performed in step 270. Following processing of the preamble, the symbol count will reach 5 indicating that the signal field has been received and that a decision directed update will be available for use at the next frequency correction update time. Accordingly, once the symbol count reaches 5, for the remainder of the particular bust OFDM signal being processed, decision directed carrier frequency update estimates will be selected in step 268 for use in step 270.

In step 270, which occurs periodically, e.g., at the detected start of a received symbol, the error estimate selected in step 268 is used to perform a frequency correction operation on the received OFDM signal. In accordance with the present invention, this frequency correction operation occurs prior to subjecting the signal to a Fast Fourier Transform (FFT) operation as done in step 262. The frequency correction operation is implemented, in one exemplary embodiment, by multiplying the selected carrier frequency correction estimate with the received signal to produce the corrected signal.

The frequency corrected OFDM signal is supplied to fine carrier frequency correction estimate generation step 260, wherein a fine carrier frequency estimate is generated from the information included in the second portion 216 of the preamble. The generated estimate is supplied to selection step 268 as previously noted.

The frequency corrected OFDM signal generated in step 270 is also supplied to FFT step 262 wherein it is subject to and FFT operation. The resulting symbol data, now present on a per tone basis, is supplied to decision directed carrier frequency error estimation step 264 which generates an error estimate on a per tone basis during each symbol time period. The symbol data produce by the FFT operation may also be used by other receiver processing steps. Thus, multiple carrier frequency error estimates are generated in step 264, one per tone. The generated error estimates corresponding to different tones of a symbol time period are supplied to weight and combine step 266. In weight and combine step 266 one decision directed carrier frequency correction estimate, e.g., error indicator value, is generated for each symbol time period from the different error estimates, e.g., error indicator values, corresponding to different tones. The error estimates corresponding to different tones are weighted as part of the combination process, in accordance with the present invention, depending on whether the tones correspond to pilots or data. Weighting is also performed in various embodiments as a function of the noise associated with a particular tone with estimates corresponding to noisy tones being given lower weight in the combination process. As an alternative or additionally, the weight applied to error estimates as part of the combination process may be made as a function of a tones detected SNR. In such embodiments tones with a low SNR may are given less weight than tones with a high SNR.

Thus, in accordance with the method of the present invention, carrier frequency error estimation is performed using decision directed estimation techniques starting with the burst OFDM's signal field and continuing with the immediately following data fields, using data symbols in addition to pilot symbols as the basis for the estimates.

Figure 4:
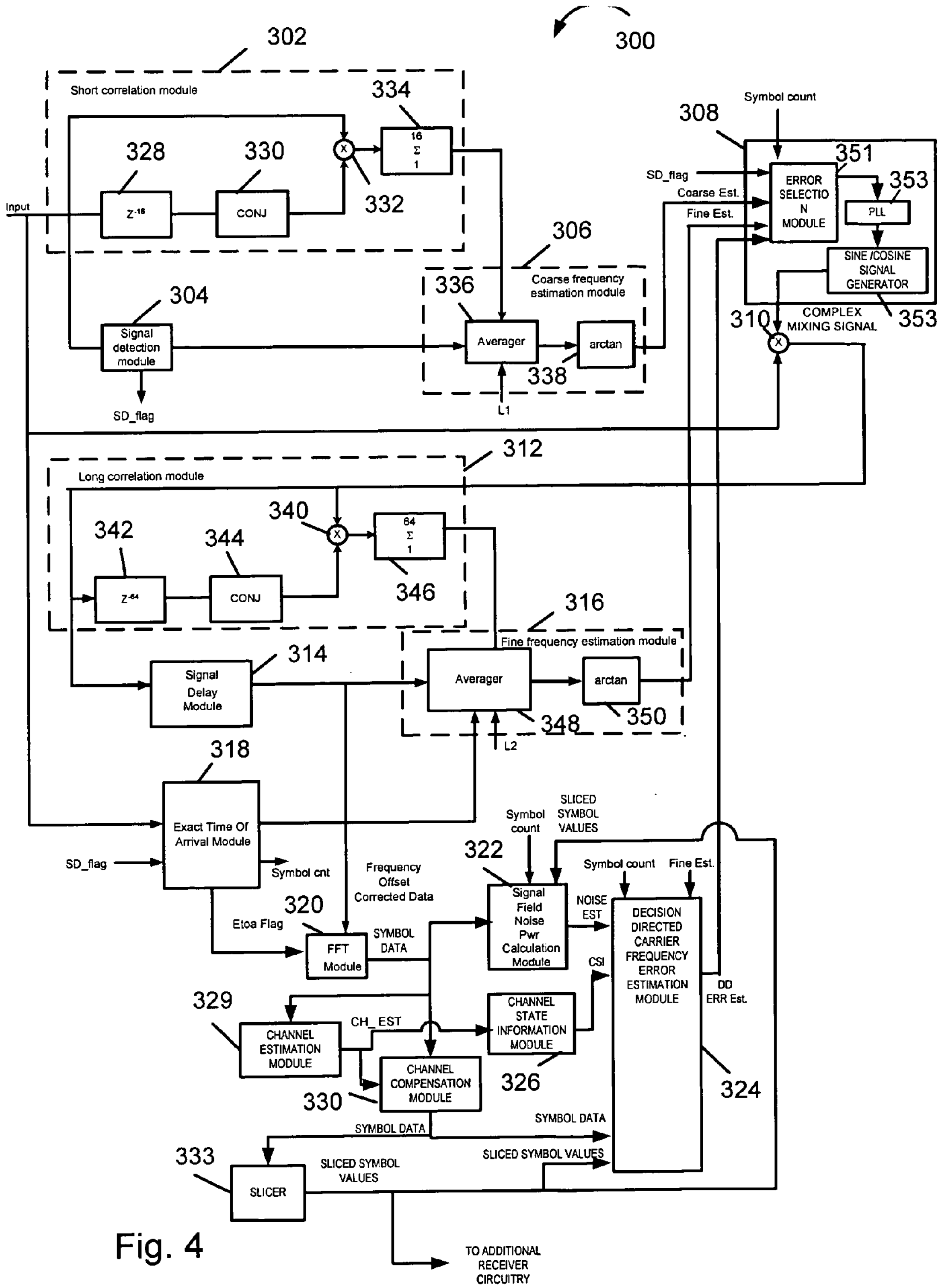
FIG. 4 illustrates a receiver apparatus which includes modules for detecting and correcting for carrier frequency offsets in accordance with the present invention.

FIG. 4 illustrates an exemplary receiver apparatus 300 implemented in accordance with the present invention. Receiver 300 includes a short correlation module 302, a signal detection module 304, a coarse frequency estimation module 306, a center frequency correction selection module 308, a complex mixer 310, a long correlation module 312, a signal delay module 314, a fine frequency estimation module 316, an exact time of arrival (ETOA) module 318, a FFT module 320, a signal field noise power calculation module 322, a decision directed carrier frequency error estimation module 324, a channel estimation module 329, a channel compensation module 330, a channel state information module 326, and a slicer 333 coupled together as shown in FIG. 4.

The center frequency correction selection module 308 is responsible for selecting which received frequency error estimate, e.g., the coarse, fine or decision directed frequency error input, to use at any given point in time. The selection process is implemented by error selection module 351 as a function of the symbol count and the value of the signal detect flag. The selection module 351 outputs a selected one of the error signals to phase lock loop (PLL) 353. The PLL 353 may be implemented as a second order PLL. The PLL 353 generates a frequency error estimate correction signal that is used to drive a complex signal generator circuit 353 which generates sine and cosine signals. The sine and cosine signals, which represent a complex frequency correction signal, are used as a complex correction signal input to the mixer 310. The mixer 310 mixes the data input signal with the complex correction signal to generate the frequency corrected data signal supplied to the long correlation module 312 and signal delay module 314.

Exemplary operation of system 300 and the modules included therein will now be discussed. Parameters for proper signal detection and processing such as carrier recovery, FFT frame time, sampling rate offset, gain control, etc., are derived from the data included in the preamble as is known in the art. In the case of carrier recovery, as discussed above, a coarse estimate of the local oscillator's offset relative to the carrier frequency, referred to herein as the carrier frequency error, is based on the first half of the preamble is derived first.

To obtain the coarse frequency estimate, the input signal is supplied to short correlation module 302 that has a delay factor equal to one of the 10 repeating short symbol in the first half of the preamble. The short correlation module 302 includes a $Z^{-16}$ delay block 328, a complex conjugate block 330, a mixer 332 and a 1 to 16 summation module 334. The result of multiplying the complex conjugate with the delayed input signal produced by multiplier 332 is summed over the length equal to one of the 10 repeating sections (short symbols) in the first half of the preamble. In the example this means that the product of multiplier 332 is summed over, 16 clock cycles to produce the output of the short correlator module 302.

The coarse frequency estimation module 306 includes an averager 336 and an arctan module 338. During the first half 214 of the preamble the coarse frequency estimation module 306, receives a data input of its averager the output of the short correlation module 302.

The averager 336 averages the output of the short correlation module 302 over a period indicated by control input L1. The averaging length, L1, is input to the averager 336 and is programmable. Depending on system parameters the value of L1 may vary. The start of the averaging process is controlled by assertion of the signal detection flag (sd_flag) which serves as another control input to the average 336.

As will be discussed below, the sd_flag signal is produced by signal detection module 304 and is use to synchronize the timing various signal processing operations. Sd_flag indicates that a valid signal has been detected at the receiver.

The arctangent of the average generated by the averager 336, is produced by arctan module 338 and scaled by the module to reflect the amount of carrier offset as discussed in "A technique for Orthogonal Frequency Multiplexing Frequency Offset Correction", Paul H. Moose, IEEE Transaction on Communications, Vol. 42, No. 10, October 1994. The article is incorporated herein by reference and hereafter is referred to as "the Moose article".

The resulting coarse frequency estimate generated by arctan module 338 serves as the coarse carrier frequency error estimate. The coarse carrier frequency error estimate is supplied to a corresponding input of the center frequency correction selection module 308.

Figure 7:
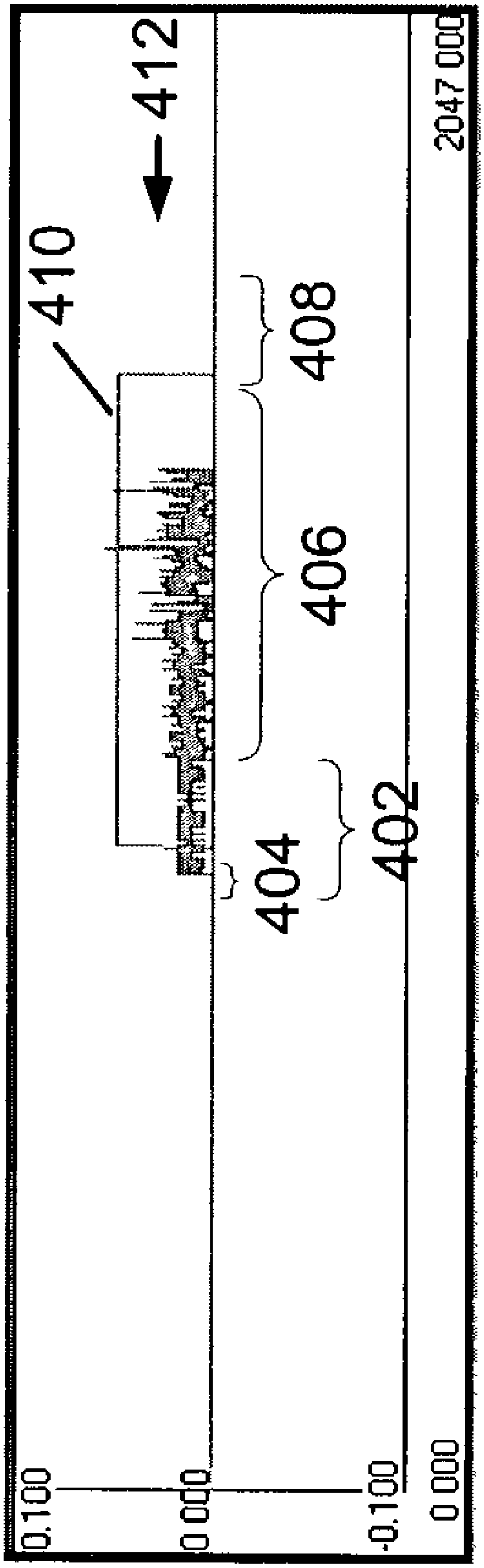
FIG. 7 is a graph illustrating a received signal as it relates to a signal detection flag that is asserted to indicate that a received signal has been detected.

Referring briefly to FIG. 7, a burst OFDM signal 412 overlaid with a valid signal detected sd_flag indicator 410. The indicator 410 shows when the sd_flag is asserted. The relatively rectangular section 402 of the signal 412 is the preamble, and the rest of the signal 412, i.e., section 406, corresponds to OFDM symbols that include the signal and data fields. It takes a short period of time for the signal detection module 304 to recognize that a valid OFDM signal is arriving as illustrated by section 404 which precedes assertion of the sd_flag. In addition, there is a slight signal processing delay where the signal 412 has ended, but the sd_flag 410 is still active. This is illustrated by section 408 which corresponds to a delay in detecting the end of the signal 412.

Figure 8:
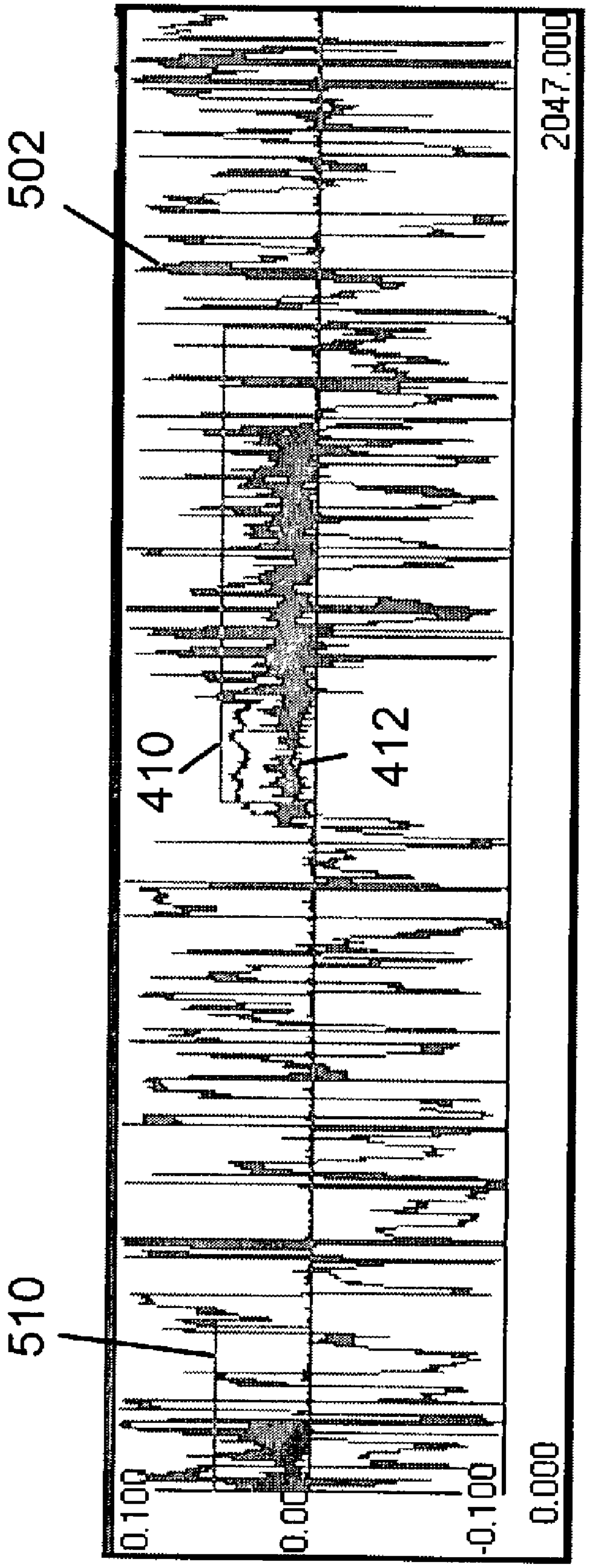
FIG. 8 is a graph illustrating the received signal along with various signals generated in accordance with the invention.

FIG. 8 illustrates the same signal 412 shown in FIG. 7, the SD_flag indicator 410 as well as an additional signal 512. At the start of FIG. 8, in addition to signal 410, the signal corresponding to a portion of a preceding burst signal is shown along with the tail end 510 of the sd_flag for the signal. The signal 512 represents an exemplary output of the short correlation module 302. The coarse frequency correction is determined and applied during processing of the preamble.

Referring again to FIG. 4, while the above described processing, e.g., coarse frequency estimation, is taking place, the input signal is also sent to Exact Time of Arrival (ETOA) module 318 which is used to indicate the ETOA of the symbol in order to determine which samples are to be used for FFT processing. The ETOA module 318 is triggered by assertion of the sd_flag, and its outputs are a count of the elapsed OFDM symbol time periods as expressed in the form of Symbol cnt, and a new flag known as the ETOA_flag used to indicate a start of a symbol.

Figure 9:
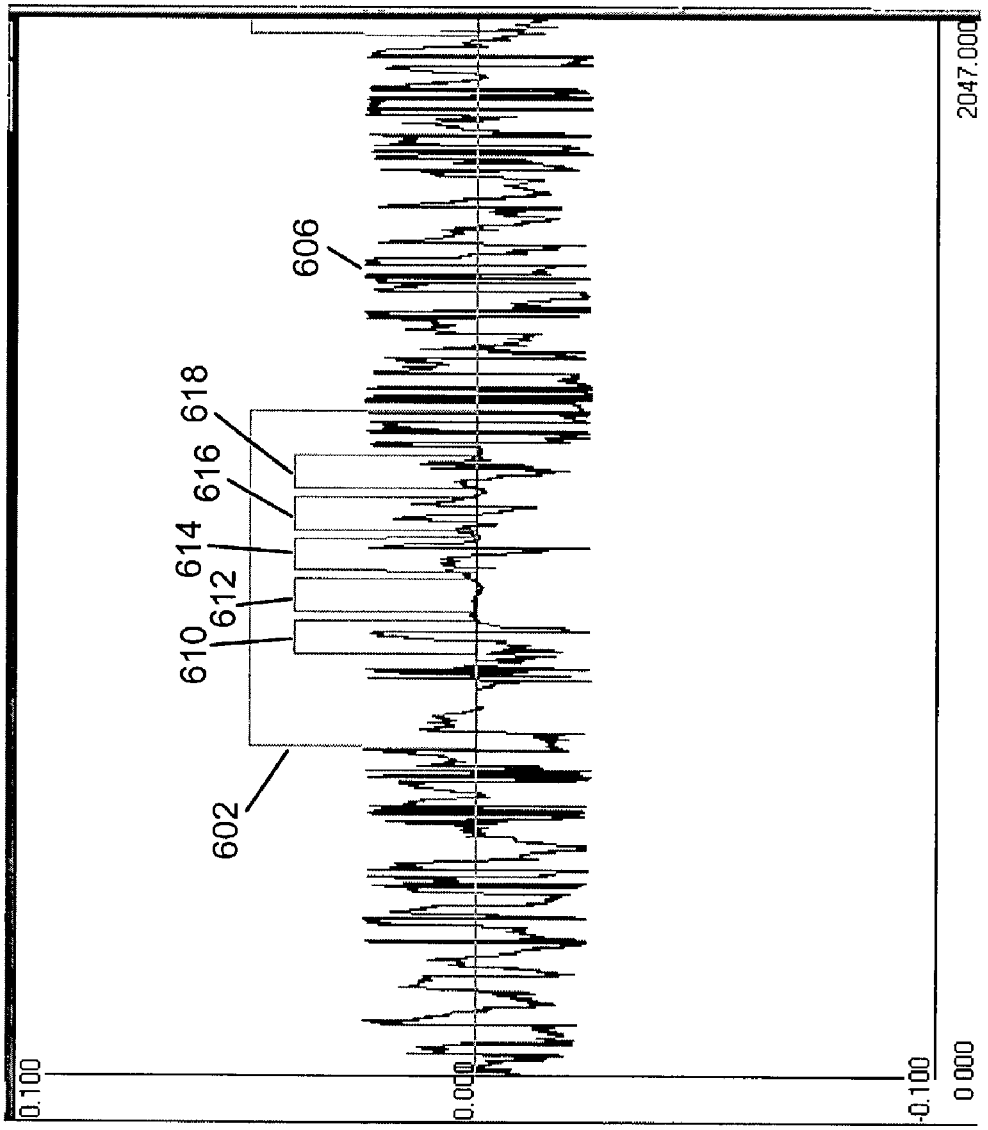
FIG. 9 is a graph illustrating a fine frequency estimate signal and various flags generated in accordance with the invention.

Referring now to FIG. 9, FIG. 9 illustrates an OFDM burst 606 that includes 5 OFDM symbols. The ETOA flag is asserted when arrival of a symbol is detected, e.g., at the front edge of each of the symbol periods indicating when the symbols have arrived. The first two periods 610, 612 indicated by the assertion of the ETOA_flag correspond to the symbols of the first and second portions of the burst preamble section. The third period 612 indicated by the assertion of the ETOA_flag corresponds to the signal field symbol. The last two periods 616, 618 correspond to data symbols.

Returning to the discussion of FIG. 4, after the coarse estimate of the carrier offset is determined, a frequency correction is applied so that proper channel estimation can be performed. Simultaneously with performing channel estimation, the system 300 determines the residual carrier offset, if any, based on the second half of the received preamble. After channel estimation is performed, the fine frequency estimation correction is applied to the data. These steps are described further below.

To obtain fine carrier frequency estimation, the structure of the second half of the preamble is exploited. After coarse frequency correction is applied, the frequency corrected signal is placed into a second correlator circuit, i.e., long correlation module 312, based on sample delayed by one symbol period (64 samples at a 20 Mhz sampling rate). The long correlation module 312 includes a $Z^{-64}$ block 342, a complex conjugate block 344, a mixer 340 and a 1 to 64 summation module 346.

This section of system 300 exploits the repeating nature of the second half of the preamble, which yields finer carrier offset estimates since all data bins are loaded with pilot signals. FIG. 9 illustrates an Sd_flag 602, an ETOA_flag 604 and a fine frequency estimate signal 606. Note that as the coarse estimate is applied at the end of the first ETOA pulse, the fine estimate approaches zero. This is a measure of the residual carrier offset not correctly measured by the coarse estimate, SNR is 10 db. As the first ETOA pulse transitions low, the average of the fine estimate is taken over L2 samples. This may be done by the fine frequency estimation module 316, which includes averager 348 and arctan module 350. At the transition of the second ETOA pulse, after passing through arctan module 350, the fine frequency estimate is applied to the carrier frequency correction selection module 308. The symbol count, which is input to the carrier frequency correction selection module 308 determines if the frequency correction block 308 applies the coarse or fine frequency estimate.

While the fine frequency offset estimate is being averaged, the data, which has been corrected by the coarse frequency estimate using mixer 310, is applied to the FFT module 320, after passing through signal delay module 314. The samples taken from the received signal are dictated by the ETOA pulse train, while high for one OFDM symbol duration.

The symbol data, now separated by tone by the FFT operation, is supplied to channel estimation module 329, channel compensation module 330 and signal field noise power calculation module 322. The data within the first two pulses of the ETOA pulse train are used by the channel estimation module 329 to calculate the channel transfer function based on the two repeating preamble sections. The channel transfer function may include in-phase (I) and quadrature (Q) phase channel information, e.g., gain, corresponding to each utilized tone. This channel estimate information CH_EST, is supplied to the channel state information module 326. The cannel state information module generates channel state information (CSI), which normally includes for each tone, the sum of the squared channel estimate values for the tones I and Q signal components. For example the CSI value for tone i may be generated as follows: $CSI_i = I^2_{CH\_ESTi} + Q^2C_{H\_ESTi}$.

In addition to supplying the channel estimate to CSI module 326, the channel estimate is supplied to channel compensation module 330 which applies the channel estimate to the FFT results to correct for channel distortions. The resulting symbol data produced by channel compensation module 330 is supplied to slicer 333.

Slicer 333 generates sliced symbol values by comparing the received symbol values to a set of expected symbol values and selecting the closest match to be output as the corresponding sliced value. The generated sliced symbol values, e.g., one per utilized tone, are supplied to signal field noise power calculation module 322, and to decision directed carrier frequency error estimation module 324 and to additional, e.g., subsequent, receiver circuitry, e.g., decoder circuitry.

In addition to the sliced symbol values, the signal field noise power calculation module 322 receives the symbol count signal. This module 322 generates noise estimates, e.g., noise error indicator values, for the various tones and supplies the generated noise estimates to decision directed carrier frequency error estimation module 324. Noise estimation techniques used by the module 322 may be based on the portion, e.g., field, of the burst signal being processed as indicated by the symbol count. Normally, one noise estimate is generated for each symbol time period.

Figure 10:
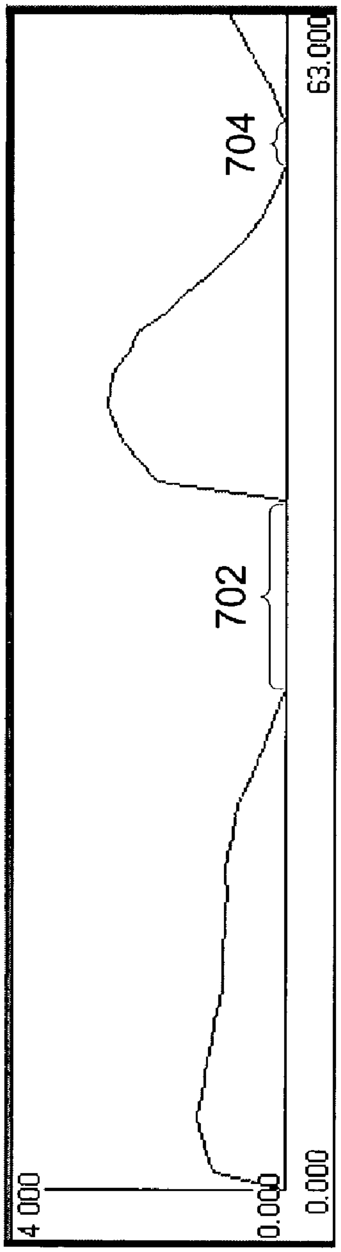
FIG. 10 is a plot of the channel state information corresponding to a received signal.
Figure 11:
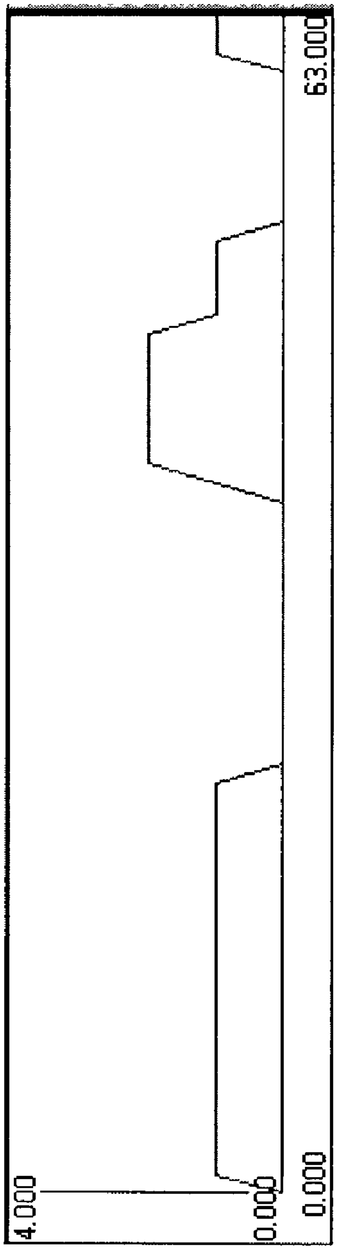
FIG. 11 is a graph illustrating results of quantizing the channel state information plotted in FIG. 10 to three different possible values.

Processing based on the channel transfer function will now be explained with reference to FIG. 10. FIG. 10 illustrates an exemplary channel transfer function estimate as expressed in the form of CSI values derived from the first two FFT blocks, i.e., the last half of the preamble, of an OFDM signal. As with the other signal diagrams, the horizontal axis corresponds to time while the vertical axis corresponds to CSI magnitude. The center section 702 is the null bins and is there for always zero. FIG. 11 illustrates an example of quantizing the channel transfer function as expressed in CSI values to three states. The representative quantization of FIG. 11 is based on if a particular channel transfer function value was above or below multiplying factors of the mean channel gain. For FIG. 11, if the channel for a particular bin was twice the mean, the quantized CSI was set to 2, if below ½ of the mean it was set to 0, if in-between this mean, the CSI was set to unity.

This quantized CSI, which is determined by channel state information module 326, in cases where quantization is used can be used to update the carrier recovery signal applied to the decision directed phase lock loop (PLL) module 324 as will be discussed below.

The second zero value section 704 shown in FIG. 10 is due to a multi-path null. Multi-path nulls are quantized to zero as shown in the quantized CSI plot of FIG. 11. This data is severely distorted and will not be given a lot of weight in frequency offset correction in accordance with one feature of the invention.

As discussed above, after the preamble is processed, the carrier recovery system switches to a data dependent mode. During this mode of operation, the center frequency correction selection module 308 will select the decision directed carrier frequency error estimate generated by decision directed estimation module 324.

Figure 5:
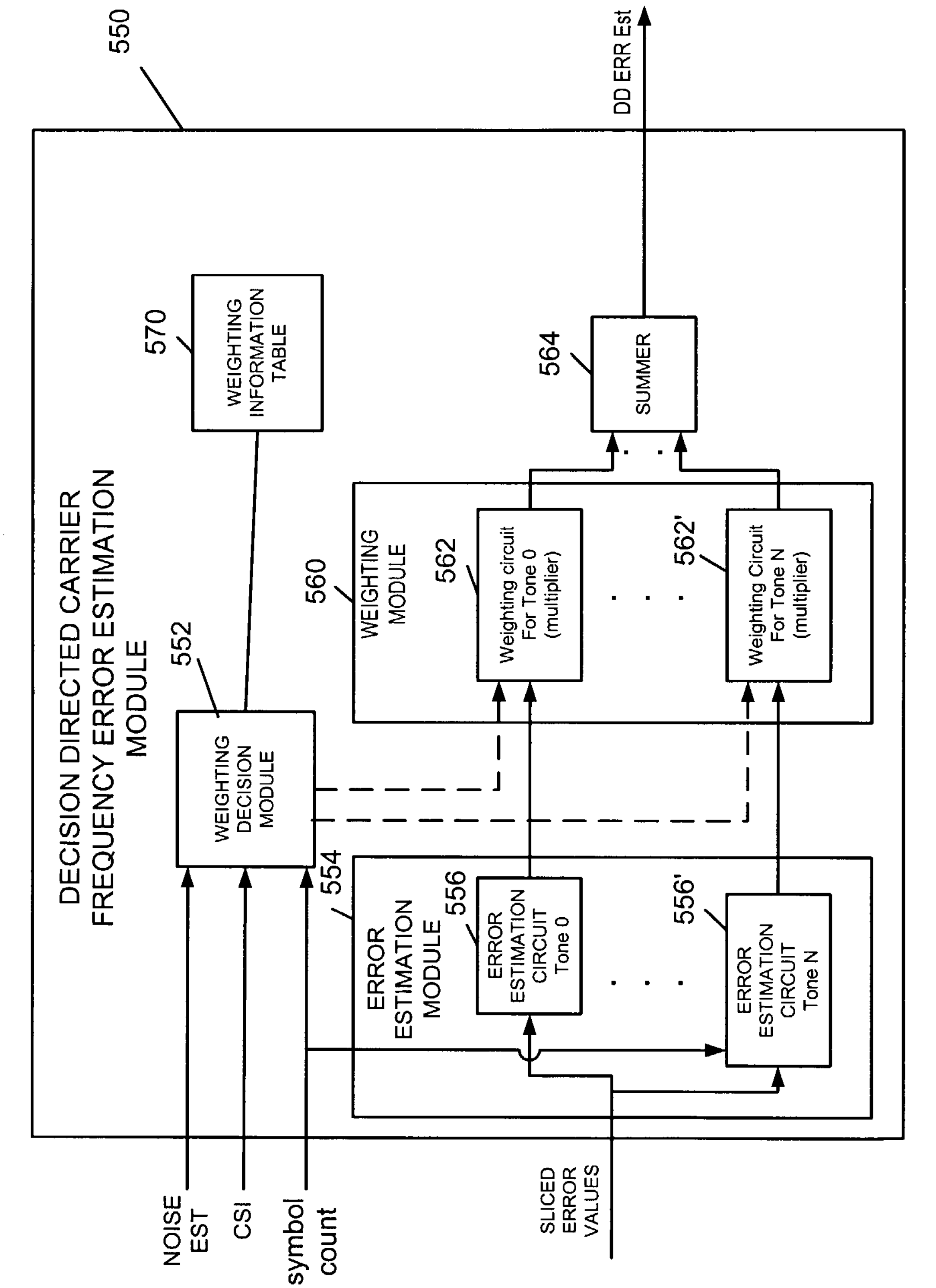
FIG. 5 illustrates a decision directed carrier frequency error estimation module implemented in accordance with the present invention which can be used in the FIG. 4 apparatus.

FIG. 5 illustrates an exemplary decision directed carrier frequency error estimation module 550 which may be used as the estimation module 324 of the FIG. 4 embodiment. The decision directed error estimation module 550 includes a error estimation module 554, weighting module 560, summer 564, phase lock loop module 565, weighting information table 570 and a weighting decision module 552.

Error estimation module 554 includes a set of error estimation circuits 556, 556' for generating error estimates, in the form of error indicator values, corresponding to individual tones. The error estimation technique used for a particular tone depends on whether data corresponding to the signal field or data field of a burst OFDM signal is being processed. The field of the signal being processed is known from the symbol count supplied to each circuit 556, 556'. In the case of processing data corresponding to a BUST OFDM signal's data field, the error estimation technique depends on whether a pilot tone is being processed or if the error is being generated for a non-BPSK, e.g., a QAM signal. The error indicator values generated for individual tones are supplied to corresponding weighting circuits 562, 562' of the weighting module 560.

Each weighting circuit 562, 562' corresponds to an individual tone and receives the weight generated by weighting decision module 552 corresponding to the tone. Weighing circuits 562, 562' may be implemented as simple multipliers. Each circuit 562, 562' multiples the corresponding received error indicator value by the supplied weight to produce a weighted frequency error indicator value corresponding to the individual tone. The weighted frequency error indicator value generated by each circuit 562, 562' is supplied to the summer 564 which sums the weighted error indicator values to generate a single frequency error indicator value based on the weighted error indicator values corresponding to multiple tones.

The sum may be divided by the number contributing weighted error indicator values to reflect a weighted average. However, in the FIG. 5 embodiment, the weighing decision module incorporates knowledge of the number of tones that will be contributing to the error indicator value generated by summer 564 and divides the weights for the individual tones by the number of contributing tones accordingly, prior to supplying the weights to the weighting module 560. In such embodiments, the weights may be numbers less than one given that multiple tones will be contributing to the error indicator value, e.g., error estimate, generated by summer 564.

The output of summer 564 is the frequency error indicator value generated from error indicator values corresponding to individual tones. This error indicator is the decision directed carrier frequency error estimate (DD_ERR_est.) which is used to update the PLL 353.

Weighting information table 570 stores weighting information used by weighting decision module 552 in determining individual weights to be applied to error indicator values corresponding to individual tones. Weighting decision module 552 receives as inputs the noise estimate generated by noise power calculation module 322, channel state information from module 326 and the symbol count signal used to indicate the field of the burst of the received OFDM signal being processed. The weighting decision module 552 generates weights for each of the tones for which error estimation module 554 generates an error indicator value. The weights may range in value from 0 to some positive number such as 10. By setting a weight to 0, the error indicator value corresponding to a tone will be ignored while setting of the weight for a tone to a high value will place greater emphasis on the error indicator value corresponding to that tone. Weights greater than 1 are normally used in implementations where the resulting sum of the weighted error indicator value will be divided by the number of contributing error indicator values.

As will be discussed below, in cases of low SNR, error indicator values, representing error estimates corresponding to pilot tones, are weighted higher e.g., assigned a greater weight, than error indicator values corresponding to data tones. Weighting decision module 552 can also be used to weight error indicator values corresponding to tones subject to channel distortions lower than error indicator values corresponding to tones subject little or relatively less channel distortion.

Error estimation generation and weighting of error indicator values will now be described in detail. When processing the signal and data fields the carrier recovery system uses a second order PLL 353 to update the initial carrier offset estimates.

With regard to DD_ERR_est signal generation, first processing of data corresponding to a Burst OFDM's signal field will be described. The signal field is sliced to BPSK by slicer 333 the resulting sliced values corresponding to each tone are supplied to the error estimation circuit 556, 556' corresponding to the tone. The unsliced symbol values for a tone are also supplied to the corresponding error estimation circuit 556, 556'. which generates the error estimate for each tone i as follows: Si×Rq. The averaged error generated by the summer 564 assuming each tone is weighed evenly will be as shown below:

$$Esf = \frac{\sum_{1}^{52} Si \times Rq}{52}$$

Where, Esf is the signal field sliced error, Si is the BPSK sliced value for a bin, i.e., 1 or −1 and Rq is the quadrature component of the FFT for the bin. Sum 1 to 52 represents summing of the error estimates, e.g., error indicator values, corresponding to the 52 active (non null) carrier bins.

This averaged error signal is directly applied to a second order PLL loop included in the PLL module 353 that updates the carrier frequency error estimate as follows:

$$W(n+1)=W(n)+Esf*K1+B(n)$$

$$B(n)=B(n-1)+Esf*K2$$

Where K1, K2 are the first and second order PLL loop gains respectively. W(n) corresponds to the fine frequency error estimate, e.g., the estimate at time n, and is the initial carrier frequency offset determined by the correlation based methods described in the Moose article that are applied to the preamble. In the above equation, for purposes of initialization, B(n) and B(n−1) may be initialized to zero.

Being BPSK and resilient to initial frequency offset errors, the signal field yields a robust estimate of the carrier offset. Performing the above error calculation and updating the carrier recovery system using the estimate yields good performance, but unfortunately holds only for BPSK data.

As the signal moves to the OFDM symbols that include data, i.e., the data field, the error signal used for carrier recovery needs to be modified to reflect that 48 of the 52 bins can be modulated other than BPSK, e.g., 16QAM to 64QAM. The 4 pilot bins continue to be modulated using BPSK throughout the data field of the OFDM signal.

The error signal to be used for tones subject to higher order modulation can be, e.g., the technique of using the quadrature component of the received signal multiplied by the sliced signal. This technique may be applied to all 52 non-null bins to simply implementation when processing values corresponding to the data field.

In such a case, assuming the error estimates for the 52 non-null tones are weighted uniformly, error signal generated by summer 564 can be written as follows:

$$Ed = \frac{\sum_{j=1}^{52} (Si \times Rq) - (Sq \times Ri)}{52}$$

Where Ed is the data field sliced error; Si is the sliced inphase value, BPSK to 64QAM, set by the recovered signal field; Sq is the sliced quadrature value, BPSK to 64QAM, set by the recovered signal field; Ri is the inphase component of the FFT bin; and Rq is the quadrature component of the FFT bin.

Sum 1 to 52 are the 52 active, i.e., non null, carrier bins. Note that the error component for the 4 pilot bins will simplify to Si*Rq, the remaining 48 data bins will use Si*Rq—Sq*Ri. The final sum of the 52 carriers represents an average assuming weighting of *frax*;1;52 was applied to the error estimate corresponding to an individual *tone*. T*he* resulting error estimate E*d* is supplied to the input of the PLL module 565 as in the case of the frequency error signal generated by processing the signal field portion of the B*urst* OFDM *signal*.

As SNR decreases, the error signal Ed becomes less reliable. This is due to the reduced unambiguous slicing region around higher order constellations. Fortunately, the 4 pilots are still very robust, being BPSK modulated. Therefore, in accordance with one feature of the present invention under low SNR conditions, more importance is placed on the 4 pilot signals as compared to the FFT bins which contain QAM values, e.g., high order QAM values were the estimates are less reliable. The weighting emphasis is controlled by weighting decision module 552.

To maintain carrier recovery stability, the emphasis on pilot sliced error signal is not performed by the weighing decision module 552 when the SNR is high, e.g., above 10 dB.

A technique for measuring the received SNR and quickly determining if pilot error boosting should be performed is described below.

While the signal field is being processed, a rough measure of the received SNR can be estimated during the OFDM symbol period. This operation may be performed by signal field noise power calculation module 322. A sum of the sliced error corresponding to the multiple tones can, and in one embodiment is, taken, which will reflect the amount of noise power on the received signal. This noise can be computed as follows:

$$N = \frac{\sum_{1}^{52} (Ri - Si)^2 + (Rq - Sq)^2}{52}$$

Where Ri is the received signal I component, Rq is the received signal Q component, Si is the sliced I decision and Sq is the sliced Q decision.

For each burst signal, the noise N is computed and compared by weighting decision module 552 to values in lookup table 570 to determine if pilot error boosting should be used. For example, if the noise value N for a symbol time exceeds a threshold value used to indicate low SNR, then pilot weight boosting will be used. The table 570 may specify different thresholds and different boost amounts for different types of modulated signals.

An exemplary threshold table 570 including pilot boost amounts is illustrated in FIG. 12. Power boosting of the pilot error component Ep, calculated same as Esf, has been shown experimentally to perform well with a boost of 8, but in various other embodiments other values may be used. In such a case, frequency error estimates corresponding to pilot tones will be weighted 8 times as much as error estimates corresponding to tones used to transmit data symbols using a non BPSK modulation technique. The boost value and/or lookup table 570 can be programmed into hardware.

The exemplary threshold table 570 of FIG. 12 includes a first column 902 of different modulation types, a second column of measured noise power thresholds 904 and a third column of pilot boost factors. The noise power threshold and the boost power factor for a particular modulation scheme can be determined by reading across the rows 908, 910, 912, 914 of the table. For example row 910, is to be used when QPSK is the modulation scheme and a boost factor of 8 is to be used when the measured noise exceeds the indicated noise power threshold of 12. The illustrated values are based on constellation sizes normalized to unity power.

The above described technique, which measures the amount of noise on an OFDM signal and determines if the 4 pilots that contribute to the error signal should be boosted or not during a given symbol period, was found in some experimental implementations to improve the packet error rate by a factor of at least 2. The improvement can be attributed to the fact that boosting places more emphasis on the reliable pilots as compared to the data bins.

Although the present invention, as described thus far, has shown to work well in pure gaussian noise, in accordance with an additional feature of the present invention, weighting factor selection by weighting decision module 552 is also made a function of detected channel conditions which can affect individual tones or portion of the communications channel spectrum.

A signal's composite SNR may include portions of the spectrum that experience destructive interference and other portions that experience constructive interference. Therefore, the error signal for each FFT bin corresponding to a tone should also be weighted by the reliability of the FFT bin.

In the FIG. 4 embodiment, channel state information values corresponding to individual tones, generated by module 326, are used by the weighting decision module 552 when deciding how to weight individual tones.

FIGS. 10 and 11 discussed earlier illustrated exemplary plots of CSI information that is generated by CSI module 326. The CSI values generated by the module CSI module 326 may be either quantized or unquantized values depending on the implementation.

One method to weighting the reliability of each FFT bin, used in some embodiments, is to incorporate the channel state information corresponding to a particular tone into the weight for that tone, e.g., by including the CSI value as one multiplier component of the utilized weight. This will result in error estimates corresponding to tones with higher CSI values being given greater weight than tones with lower CSI values indicative of less reliable information.

In some embodiments the channel state values are quantized prior to use in generating weighting values. Such quantization may involve, noticing which FFT bins are above or below the mean gain of the channel as was described earlier with reference to FIG. 11.

In embodiments where CSI information is used to perform weighting of error estimates corresponding to different tones, the error signal Ed supplied to the PLL module 565 can be more descriptively written as follows:

$$Ed=\frac{\sum_{j=1}^{48}[Si(j)\times Rq(j)-Sq(j)\times Ri(j)]\times CSI(j)+\sum_{j=1}^{4}Si(j)\times Rq(j)\times CSI(j)\times PB}{N\ \text{gain}}$$

Where PB is the amount of pilot boosting used if the signal field noise calculation exceeded the thresholds in the table above. Ngain is a normalizing gain factor such that the overall loop gain does not change based on the gain applied by the CSI. The first summation includes calculations for the non-pilot bins and the second summation includes calculations for the four pilot bins.

The decision directed error signal DD_ERR_Est generated by PLL module 565 is transmitted is supplied to the center frequency correction selection module 308 which selects it to be output once the signal field has been processed to produce the first DD_ERR_Est and subsequently for the duration of the burst OFDM signal. The input signal is mixed with the correction value by mixer 310 and the corrected received signal is sent to the remainder of the receiver after passing through signal delay module 314 and FFT module 320. The present invention provides a robust and reliable carrier recovery system, minimizing constellation tilts, and drifting carrier recovery estimates.

The steps of the various methods of the invention discussed above may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps discussed above.

Figure 6:
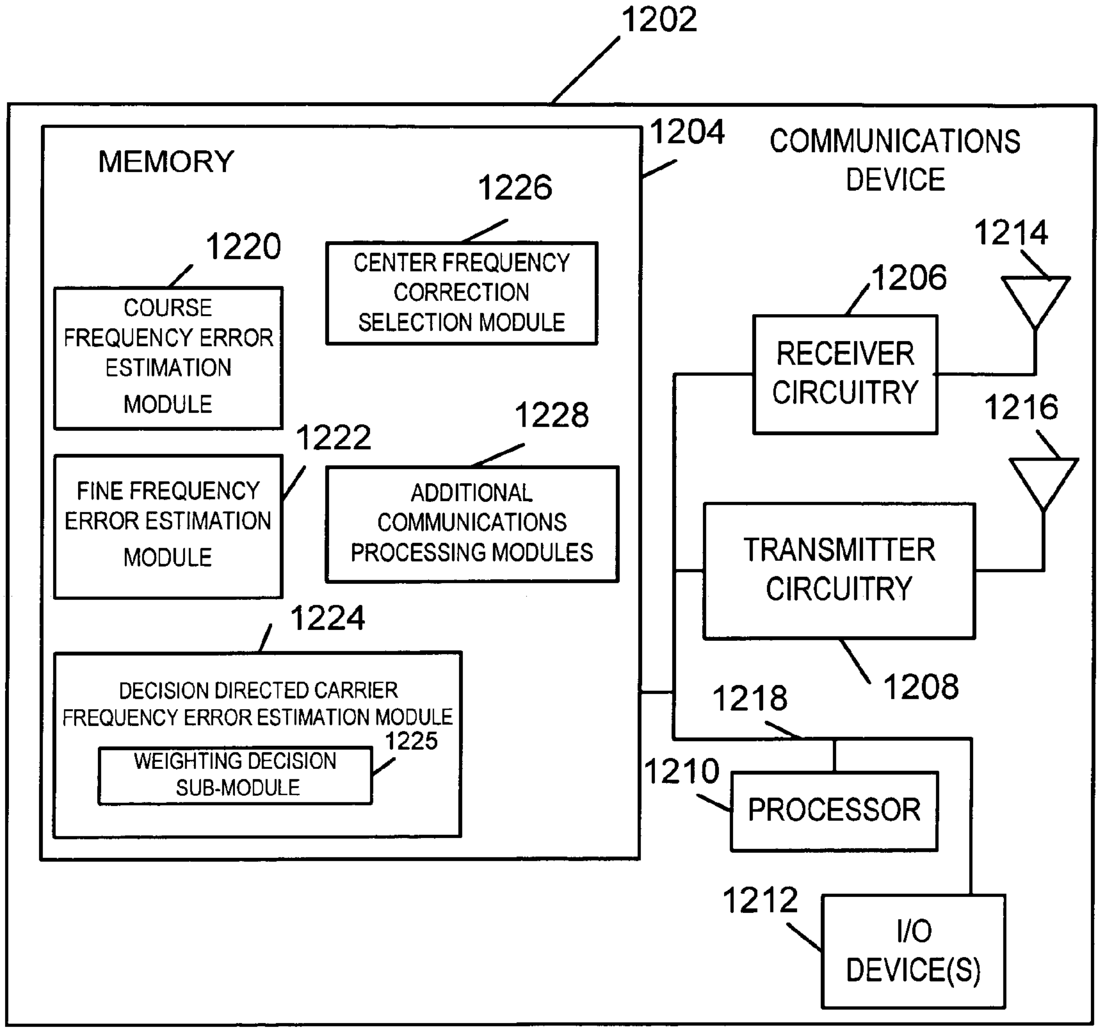
FIG. 6 illustrates a programmable apparatus, e.g., computer system, including software and central processing unit for implementing the signal processing method of the present invention.

FIG. 6 illustrates an exemplary communications device 1202 wherein the present invention is implemented through the use of software modules (1220, 1222, 1224, 1226, 1228 and sub-module 1225) executed by a processor 1210, e.g., CPU. The communications device 1202 includes memory 1204, receiver circuitry 1206, transmitter circuitry 1208, processor 1210 and input/output device 1212, coupled together by bus 1218 as shown in FIG. 6. The I/O devices 1212 may include a keypad, display, microphone, speakers and/or other known input and/or output devices. Antennas 1214, 1216 are coupled to the receiver circuitry 1206 and the transmitter circuitry 1216, respectively, for receiving and transmitting wireless signals, e.g., OFDM communications signals transmitted through a multi-tone communications channel, e.g., the air. Receiver circuitry 1206 supplies received OFDM communications signals, e.g., pilot tones and/or data, to the processor 1210 for processing under control of the modules included in memory 1204.

Memory 1204 includes a coarse frequency estimation module 1220, a fine frequency error estimation module 1222, a decision directed carrier frequent error estimation module 1224, a center frequency correction selection module 1226 and additional communications processing modules 1228. Each of the modules includes machine executable instructions. These modules, when executed by processor 1210, control the communications device 1202 to perform the same operations as those performed by the like-named modules of the communication system 300 shown in FIG. 4. Weighting decision sub-module performs frequency error estimate weighting operations in the same fashion as previously described weighting decision module 552. The additional communications processing modules 128 include modules for performing functions of circuits and/or modules shown in FIGS. 4 and 5 but not explicitly shown in memory 1204.

Various steps of the method of the present invention, performed by the processor 1210 when operating under the control of the modules included in memory 1204, are shown in the previously described flow chart 300 of FIG. 3.

While described in the context of a bust OFDM signal, the receiver frequency correction methods and apparatus of the present invention can be used with other multi-tone signals having a similar signal structure.

What is claimed is:

1. A method of processing a multi-tone signal, comprising the steps of:

generating a non-decision directed carrier frequency offset error estimate based on information included in a preamble of said signal;

performing a first frequency correction operation on at least a portion of said multi-tone signal using said non-decision directed carrier frequency offset error estimate;

generating a first decision directed carrier frequency offset error estimate from a signal field following said preamble of the multi-tone signal; and performing a second frequency correction operation on said signal using the first decision directed carrier frequency offset error estimate.

2. The method of claim 1, further comprising:

generating a second decision directed carrier frequency offset error estimate from a data field immediately following said signal field in said multi-tone signal; and performing third frequency correction operation on said signal using the second decision directed carrier frequency offset error estimate.

3. The method of claim 2, wherein said second frequency correction operation includes:

i) generating an error correction signal from said first decision directed carrier frequency offset error estimate; and ii) multiplying a second portion of said multi-tone signal with said error correction signal; and wherein said third frequency correction operation includes:

i) generating another error correction signal from said second decision directed carrier frequency offset error estimate; and ii) multiplying a third portion of said multi-tone signal with said another error correction signal.

4. The method of claim 2, wherein generating said second decision directed carrier frequency offset error estimate includes:

generating a frequency error estimate for at least one tone used to transmit a pilot symbol and another frequency error estimate for one tone used to transmit a data symbol, during the same symbol time period; and generating a weighted average from said frequency error estimate and said another frequency error estimate.

5. The method of claim 4, further comprising:

weighting said frequency error estimate corresponding to said pilot symbol more than said another frequency error estimate corresponding to said data symbol when the multi-tone signal has a low signal to noise ratio.

6. The method of claim 4, further comprising:

weighting said frequency error estimate corresponding to said pilot symbol equally with said another frequency error estimate corresponding to said data symbol when the multi-tone signal has a high signal to noise ratio.

7. The method of claim 6, further comprising the step of:

determining if said multi-tone signal has a high signal to noise ratio by estimating the noise power of the signal and comparing said noise power to a threshold.

8. The method of claim 4, further comprising:

generating a noise power value indicative of the noise power of said multi-tone signal; and weighting said frequency error estimate corresponding to said pilot symbol more than said another frequency error estimate corresponding to said data symbol when said noise power value is above a threshold.

9. The method of claim 8, further comprising:

performing a look-up operation to determine said threshold from a look-up table including different thresholds for different methods of modulating data symbols.

10. The method of claim 9, further comprising:

comparing said noise power value to the threshold determined by said look-up operation.

11. The method of claim 4, further comprising:

estimating channel condition corresponding to said at least one tone used to transmit a data symbol; and wherein said step of generating a weighted average is performed as a function of said channel condition estimate.

12. The method of claim 11, wherein said step of generating a weighted average includes:

weighting frequency error indicator values corresponding to channel distorted tones less than frequency error indicator values corresponding to less noisy tones.

13. The method of claim 12, wherein said channel distorted tones correspond to a portion of said communications channel estimated to include more distortions than portions of said communications channel corresponding to said less noisy tones.

14. The method of claim 5, wherein said multi-tone signal is a burst orthogonal frequency divisional multiplexing signal compliant with the 802.11a standard.

15. A machine-readable media comprising machine readable instructions for controlling a computer to perform the processing steps recited in claim 1.

16. An apparatus for processing a multi-tone signal including a preamble, a signal field following the preamble, and a data field following said signal field, the apparatus comprising:

a fine frequency error estimation module for generating a fine carrier frequency offset correction estimate from at least a portion of said preamble;

a decision directed frequency error correction module for generating decision directed carrier frequency error correction estimates from said signal field and from said data field;

a frequency error correction module coupled to said fine frequency error estimation module and said decision directed frequency error estimation module for generating a frequency error corrected signal; and a fast Fourier transform module for performing a fast Fourier transform operation on said frequency error corrected signal.

17. The apparatus of claim 16, further comprising:

a center frequency correction selection module for coupling the fine frequency error estimation module and the decision directed frequency error correction module to said frequency error correction module.

18. The apparatus of claim 17, wherein said frequency error correction module is a multiplier which multiples at least a portion of the multi-tone signal with a frequency error correction signal selected by said center frequency correction selection module.

19. The apparatus of claim 17, wherein said decision directed frequency error correction module, includes means for generating frequency error estimates corresponding to different tones during each symbol period following said preamble; and means for generating a weighted average of frequency error estimates corresponding to different tones corresponding to the same symbol time period.

20. The apparatus of claim 19, wherein said means for generating a weighted average places greater weight on frequency error estimates corresponding to tones used to transmit pilot symbols than it places on frequency error estimates corresponding to tones used to transmit data symbols when at least a portion of said multi-tone signal is determined to have a low signal to noise ratio.

21. The apparatus of claim 19, wherein said means for generating a weighted average places greater weight on frequency error estimates corresponding to tones used to transmit pilot symbols than it places on frequency error estimates corresponding to tones used to transmit data symbols when at least a portion of said multi-tone signal is determined to have a noise power level exceeding a predetermined threshold.

22. The apparatus of claim 20, wherein said means for generating a weighted average places greater weight on frequency error estimates corresponding to tones corresponding to portions of a communication channel estimated to have less noise than at least some other portions of said communication channel.

23. The apparatus of claim 20, wherein said means for generating a weighted average places greater weight on frequency error estimates corresponding to tones corresponding to portions of a communication channel estimated to have low noise than it places on frequency error estimates corresponding to tones corresponding to portion of a communication channel estimated to have high noise.

24. The apparatus of claim 23, wherein said apparatus is a burst orthogonal frequency division multiplexing receiver.

25. A receiver for receiving a burst orthogonal frequency division multiplexing signal, comprising:

means for generating a coarse frequency correction estimate from a first portion of a preamble included in said signal;

means for generating a fine frequency correction estimate from a second portion of said preamble;

means for generating decision directed frequency correction estimates from a signal portion of said signal and from a data portion of said signal, said means for generating a decision directed frequency correction estimate using both data symbol values and pilot values when processing said data portion of said signal to generate frequency correction estimates; and means, coupled to each of said means for generating said fine frequency correction estimate and said means for generating said decision directed frequency estimates, for selecting which of said generated frequency correction estimates to use at any given point in time to perform a frequency correction operation on said signal.

26. The receiver of claim 25, wherein said means for generating decision directed frequency correction estimates generates one frequency correction estimate to be supplied to said means for selecting during each symbol period following said preamble.

27. The receiver of claim 26, wherein said means for generating decision directed frequency correction estimates generates said one frequency correction estimate by performing a weighed average of frequency error estimates corresponding to different tones of said signal, the weighting of frequency error estimates corresponding to different tones being a function of estimates of channel noise corresponding to the different tones.

28. The receiver of claim 26, further comprising;

means for detecting high signal to noise levels; and wherein said means for generating decision directed frequency correction estimates generates said one frequency correction estimate by performing a weighed average of frequency error estimates corresponding to different tones of said signal, frequency error estimates corresponding to pilot tones being weighted more than the frequency error estimates corresponding to tones used to transmit data symbols when a high signal to noise level is detected.

29. A method of performing a frequency correction operation on an orthogonal frequency division multiplexing (OFDM) signal including a preamble portion and additional portions, each additional portion including pilot symbols and data symbols, the method comprising the steps of:

generating a first frequency correction signal from the preamble portion of said orthogonal frequency division multiplexing signal;

generating a second frequency correction signal from one of said additional portions, the step of generating a second frequency correction signal including:

generating frequency error indicator values corresponding to pilot symbols included in said one of said additional portions;

generating frequency error indicator values corresponding to data symbols by performing decision directed error estimation operations on data symbols included in said one of said additional portions; and generating a weighted average from said frequency error indicator values corresponding to pilot symbols and said frequency error indicator values corresponding to data symbols.

30. The method of claim 29, wherein said step of generating a weighted average includes weighting said frequency error indicator values corresponding to pilot symbols more than said frequency error indicator values corresponding to data symbols when said orthogonal frequency division multiplexing signal is determined to have a low signal to noise ratio.

31. The method of claim 30, wherein said step of generating a weighted average includes weighting said frequency error indicator values corresponding to pilot symbols the same as said frequency error indicator values corresponding to data symbols when said orthogonal frequency division multiplexing signal is determined to have a high signal to noise ratio.

32. The method of claim 31, further comprising:

supplying said weighted average to the input of a phase lock loop circuit used to generate an oscillator control signal;

operating an oscillator to generate said frequency correction signal in response to the oscillator control signal; and performing a frequency correction operating on at least a portion of said orthogonal frequency division multiplexing signal by mixing said frequency correction signal with said at least a portion of said orthogonal frequency division multiplexing signal.

33. The method of claim 29, wherein said step of generating a weighted average includes weighting said frequency error indicator values corresponding to pilot symbols more than said frequency error indicator values corresponding to data symbols when said orthogonal frequency division multiplexing signal is determined to be noisy.

* * * * *